United States Patent [19]

Haug et al.

[11] 4,250,371

[45] Feb. 10, 1981

[54] ACCURATE PRODUCTION OF RELIEVED SHAPES BY ELECTRICAL EROSION

[75] Inventors: Edward W. Haug; William C. Smith, both of Rockford, Ill.

[73] Assignee: Barber-Colman Company, Rockford, Ill.

[21] Appl. No.: 5,271

[22] Filed: Jan. 22, 1979

[51] Int. Cl.³ .............................................. B23P 1/14
[52] U.S. Cl. .............................. 219/69 W; 204/129.5; 219/69 G
[58] Field of Search ............... 219/69 W, 69 G, 69 E; 204/129.5

[56] References Cited

U.S. PATENT DOCUMENTS

| 3,731,045 | 5/1973 | Ullmann et al. ............ 219/69 V |
| 3,849,624 | 11/1974 | Dulebohn et al. ............ 219/69 W |
| 3,943,322 | 3/1976 | Lehmann et al. ............ 219/69 W X |
| 3,946,189 | 3/1976 | Polmella et al. ............ 219/69 W X |
| 4,081,652 | 3/1978 | Jänicke et al. ............ 219/69 W |

Primary Examiner—C. L. Albritton
Assistant Examiner—D. A. Tone
Attorney, Agent, or Firm—Robert M. Hammes, Jr.; A. Richard Koch

[57] ABSTRACT

A method and apparatus for accurately producing relieved cutting tools and other relieved shapes by electrical erosion, whereby the workpiece is maintained in a horizontal position and a wire electrode is tilted at the desired relief angle from vertical after which they are moved relative to each other in a manner such that the spacing between them in a horizontal plane is compensated for the elliptical cross-section of the working gap in the horizontal plane.

11 Claims, 6 Drawing Figures

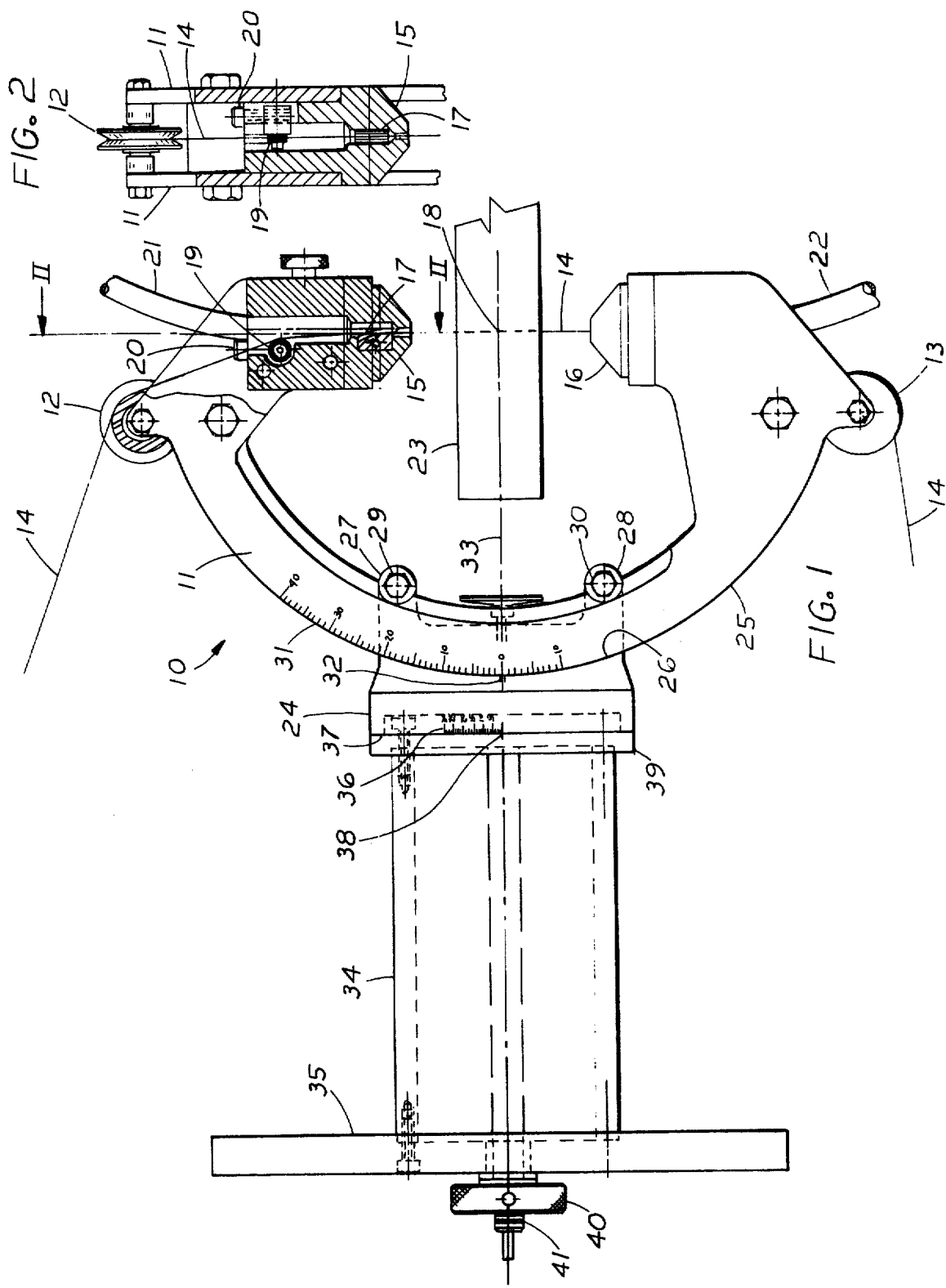

ACCURATE PRODUCTION OF RELIEVED SHAPES BY ELECTRICAL EROSION

BACKGROUND OF THE INVENTION

This invention concerns metal working and more specifically the shaping of a workpiece by removing material by electrical erosion.

It is well-known that cutting tools have been relieved to provide clearance with the profile of the tool being maintained constant in planes parallel to the cutting face so that, as the tool was repeatedly sharpened, the cutting edge would retain the same shape.

When shapes were produced by electrical erosion of electrically conducting plates, the plate was positioned horizontally and a wire electrode was positioned vertically while the plate and electrode were moved relative to each other in a horizontal plane as an electric current was passed between them to erode the workpiece in such a manner as to produce the desired shape. The electric current removed material from the workpiece throughout a working gap, which required that the electrode be spaced from the periphery of the desired shape by a distance equal to the radial length of the working gap, which, under these conditions, would be uniform in all radial directions. This made programming of the relative motion very simple.

If the erosion was produced by electrical discharge machining, a stream of dielectric fluid was directed into the working gap to carry away the eroded material and so prevent a short-circuit, which would burn the electrode and the workpiece. If the erosion was produced by electrolysis, a stream of electrolyte was required to carry the electrical current between the electrode and the workpiece, thereby permitting erosion to occur and carrying away the eroded material. This proved to be very satisfactory for producing unrelieved shapes.

For producing relieved shapes, the workpiece was tilted at the desired relief angle from horizontal and the electrode and workpiece were moved relatively in a horizontal plane. It was a simple matter to project the desired shape on the horizontal plane and to maintain the electrode spaced from the periphery of the projected shape by the predetermined fixed radial length of the working gap. Trouble was encountered, however, by the stream of fluid tending to flow down the sloping surface of the workpiece rather than into the working gap. As a result, short-circuits were created between the electrode and the workpiece when the eroded material was not removed during electrical discharge machining and material erosion ceased or was reduced when electrolyte was diverted from the working gap during electrolysis. Another problem involved the accuracy of the produced shape. Because the electrode is guided above and below the workpiece, the spacing between the guides had to be greater in order to clear the workpiece at its uppermost point and at its lowermost point on the desired shape. The longer unsupported length of electrode between the guides permitted more deviation from its desired path with relation to the profile of the desired shape. This is more easily recognized when it is understood that the electrode vibrates.

In an attempt to cure these problems, the work-piece was maintained in horizontal position while the electrode was tilted at the desired relief angle from vertical. The fluid was thus prevented flow flowing away from the working gap and the spacing between electrode supports could be reduced, since they were in a fixed vertical relation to the workpiece. A problem arose in maintaining the electrode at the proper distance from the periphery of the desired shape, which problem was evidenced by inaccuracies in the produced shapes.

SUMMARY OF THE INVENTION

This invention eliminates the problems encountered in producing by electrical erosion relieved cutting tools or similarly relieved shapes when the workpiece is positioned horizontally by making allowance for the elliptical erosion pattern produced as a consequence of tipping the electrode. The electrode guides can be spaced just far enough apart to clear the horizontal workpiece when the electrode is at the desired angle. There is no flushing problem because the workpiece is horizontal.

BRIEF DESCRIPTION OF THE DRAWINGS

FIG. 1 is an elevation of a fixture, partially in section, for tilting an electrode in an electrical erosion machine according to this invention.

FIG. 2 is a sectional view along line II—II in FIG. 1.

DESCRIPTION OF THE PREFERRED EMBODIMENT

Figure 3:
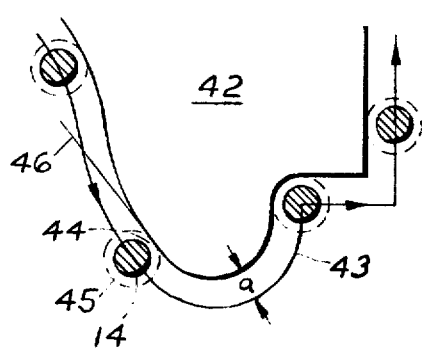
FIG. 3 is a plan view showing, partially in section, the path followed by an electrode in a vertical position as it cuts a form according to the prior art.

The head 10 of an electrical erosion machine, as shown in FIG. 1, comprises a substantially symmetrical arcuate C-frame 11 having grooved rollers 12, 13 guiding a wire electrode 14 from a supply roll (not shown) and to a take-up roll (not shown) respectively, so that the electrode always follows the same path to the head. At each end 15, 16 of the C-frame is a grooved sapphire guide 17 positioned to guide the electrode 14 substantially through the center 18 of the arc of the C-frame 11. In at least one of the ends 15, 16 the electrode engages a contact 19 which carries electricity from a terminal 20 to the electrode. Tubes 21, 22 conduct fluid through the ends 15, 16 to the workpiece 23. In an electric discharge machine, the fluid is a dielectric employed to flush away the eroded material. In an electrochemical machine, the fluid is an electrolyte carrying current between the electrode 14 and the workpiece 23.

The C-frame 11 is adjustably mounted on a support 24 with the convex arcuate surface 25 of the C-frame engaging a matching concave arcuate surface 26 on the support, such that the C-frame may be mounted in different angular positions about the center 18 with respect to the support. Coned clamps 27, 28 tightened by bolts 29, 30 retain the C-frame against surface 26 at the desired angular position. An angular scale 31 adjacent the convex arcuate surface 25, in combination with an index mark 32 on the support 24, assists in positioning the electrode 14 at the desired relief angle. As shown, the index mark 32 lies in a horizontal plane through the center 18. When the zero mark on the scale 31 coincides with the index mark, the wire electrode 14 is vertical between the ends 15, 16. In any other angular position of the C-frame, the mark on the scale that is aligned with the index mark indicates the relief angle by which the electrode deviates from vertical. The ends 15, 16 must be spaced apart sufficiently to clear the workpiece 23 in any desired angular position of the electrode.

Figure 6:
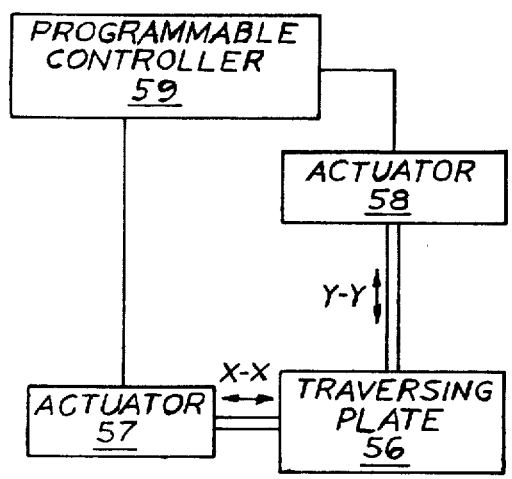
FIG. 6 is a schematic showing of a traverse mechanism and its controlling means.

The support 24 is adjustably mounted for rotation about its centerline 33 on a stud 34, which, in turn, is fixedly mounted on a fixture mounting plate 35 which may, or may not, be movable by a traverse mechanism, as in FIG. 6. The centerline 33 is horizontal and intersects the electrode 14 at the center 18, which permits the electrode to be rotated about the centerline to provide a helix angle. To assist in setting the helix angle, an angular scale 36 on the edge 37 of support 24 cooperates with an index mark 38 on a flange 39 affixed to stud 34. When the zero mark on scale 36 is aligned with the index mark 38, the C-frame 11 and the electrode 14 lie in a vertical plane. In any other angular position of the support, the mark on the scale 36 that is aligned with the index mark 38 indicates the helix angle by which the electrode deviates from vertical. The support is clamped to the stud at any desired helix angle by a nut 40 threaded on a threaded rod 41 affixed to the support 24 and passing through the stud 34 and the fixture mounting plate 35.

In operation fluid flows through the tubes 21, 22 and along the electrode 14 into the cut being made in the workpiece by an electric current between the electrode and the workpiece 23 and supplied by a suitable source of electricity (not shown) connected between terminal 20 and the workpiece.

When cutting any shape 42 from any workpiece 23 by means of a vertical wire electrode 14 according to prior art, it is only necessary to move the electrode and workpiece laterally with respect to each other such that the electrode follows a path 43, as illustrated in FIG. 3, spaced from the horizontal projection of the desired shape by a constant distance a determined by the sum of the radius of the electrode and the radial length of the working gap 44. The working gap is the effective distance around the electrode 14 from which the metal, or other electrically conductive material, is removed by electrical erosion. The gap is circular and its periphery 45 has a common tangent 46 to the desired shape. The electrode is shown in several positions in FIG. 3.

Figure 4:
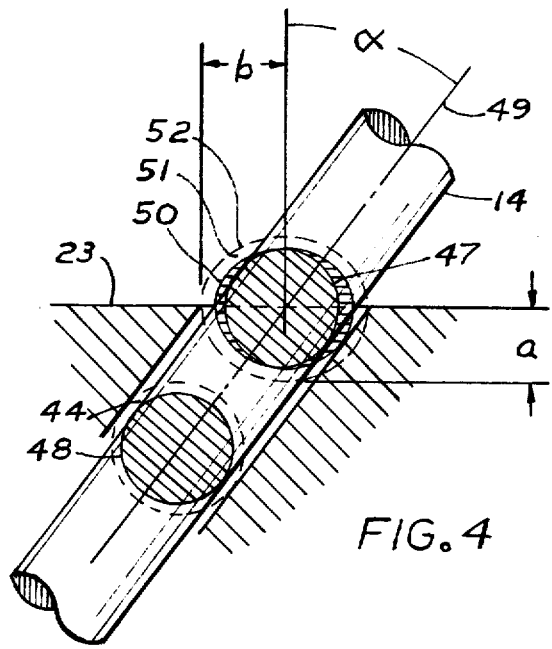
FIG. 4 is an elevation, partially in section, showing the effect of tipping the electrode from the vertical position.

FIG. 4 shows what happens when a wire electrode 14 enters the horizontal workpiece 23 at an angle α from vertical. Cross-sections 47 and 48 are taken perpendicular to the axis 49 of the electrode 14. A cross-section 50 of electrode 14 is taken in the horizontal plane of the work-piece 23. It will be noted that cross-section 50 has the shape of an ellipse with its major axis in the vertical plane of the angle α, that its length along the major axis is greater than the diameter of the circle produced by the perpendicular cross-section 47, and that its length along the minor axis is identical to the diameter of the cross-section 47. The working gap 44 surrounding the electrode 14 at cross-section 48 is of course circular and constant, but the working gap 51, measured in the horizontal plane of the workpiece 23, is neither circular nor constant. The outer periphery 52 of the working gap 51 is also in the shape of an ellipse. It is this ellipse that determines the path to be followed in the horizontal plane by the electrode 14. As shown, the minor half axis of the ellipse 52 is of length a and the major half axis is of length b=a sec α.

Figure 5:
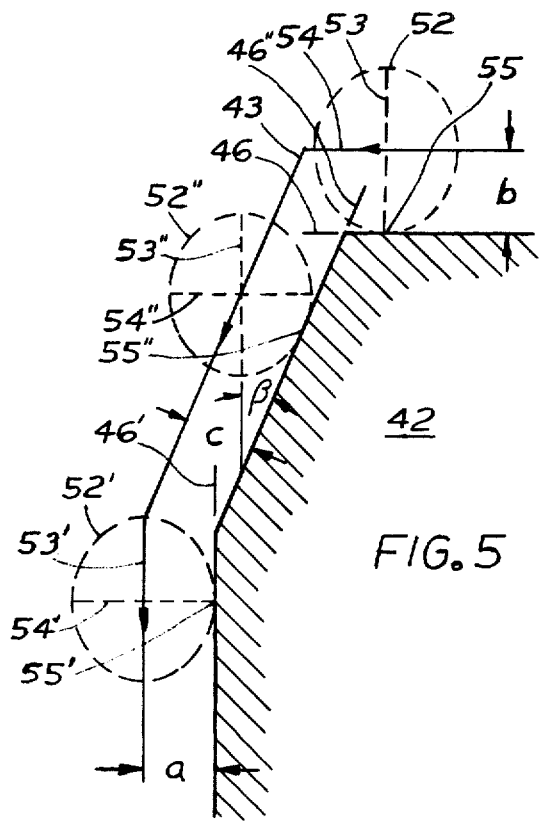
FIG. 5 is a plan view showing the path followed by a tipped electrode as it cuts a form according to this invention.

As seen in FIG. 5, the elliptical outer periphery of the horizontal working gap of the tilted electrode is shown in several positions 52, 52', 52" with respect to the desired shape 42. When the major axis 53 lies perpendicular to the path 43 being followed by the electrode, the path is spaced farthest from the desired shape 42 by the length of the major half axis b. When the major axis at 53' lies along the path, the path is closest to the desired shape by the length of the minor half axis a. This is the same spacing a as in FIG. 3, wherein the electrode was vertical. When the major axis, as at 53", lies in any other relation to the path, the path is spaced at some distance c intermediate the lengths of the minor and major half axes from the desired shape. When the minor axis 54 is aligned with the path 43, the common tangent 46 is parallel to the minor axis and the point of tangency 55 is at the end of the major axis 53. When the major axis is aligned with the path as at 53', the common tangent 46' is parallel to the major axis and the point of tangency 55' is at the end of the minor axis 54'. When neither axis lies along the path 43, as at 52", there is still a common tangent 46" and a point of tangency 55", but they are not simply related to the axes 53", 54".

In order to determine the location of the electrode 14 along path 43, the angle β between the major axis 53" and the common tangent 46" must be known. It can be found from the desired shape 42, the orientation of the shape on the machine, the formula for the elliptical periphery of the working gap 52" and the orientation of the electrode on the machine. The formula for an ellipse (in which x is measured along the minor axis and y along the major axis) is $$x^2/a^2 + y^2/b^2 = 1$$

ps from which we obtain the formula for its slope at any point as $$\frac{dy}{dx} = \pm \frac{-bx}{a(a^2 - x^2)^{\frac{1}{2}}} = \tan \beta$$

Since β is known at any point on the desired shape, and a and b are constants we may solve for x, obtaining $$x = \pm \frac{a^2}{(b^2 \cot^2 \beta + a^2)^{\frac{1}{2}}}$$

Then $$y = \pm b \left(1 - \frac{a^2}{b^2 \cot^2 \beta + a^2}\right)^{\frac{1}{2}}$$

The calculated x and y are the coordinates of the point of tangency 55" with respect to the center of the ellipse, through which the electrode 14 passes. The path is therefore the locus of a point, the instantaneous position of which is determined by the summation of the coordinates of the respective point of tangency 55 and the x and y coordinates of the electrode with respect to the point of tangency. Except for the simplest shapes, such loci are most conveniently handled by a computer.

Since movement of the electrode must be very slow and precise, it is almost inevitably controlled by some sort of automatic controller. As shown in FIG. 6, the traversing plate 56, upon which either the workpiece 42 or the head 10 is mounted, is moved from side-to-side in X-X direction by an actuator 57 and forward and backward in Y-Y direction by another actuator 58. The operation of both actuators 57, 58 is controlled as by a numerical, or other, programmable controller 59, which is programmed to cause the electrode 14 to move along that path 43 required to produce the desired shape 42. The program is determined as indicated above.

I claim:

1. A method for producing a desired relieved shape from an electrically conductive workpiece by electrical erosion, said method comprising the steps of locating an upper surface of the workpiece in a substantially horizontal plane, tilting a wire electrode at a desired relief angle from vertical, passing an electric current between the workpiece and said electrode to erode material from the workpiece throughout a predetermined fixed working gap, and relatively moving said electrode and workpiece in such a manner as to maintain constant the perpendicular distance between said electrode and the outline of the relieved shape in the horizontal plane, said perpendicular distance being equal to said working gap.

2. A method according to claim 1 further comprising flowing a dielectric fluid through said working gap.

3. A method according to claim 1 further comprising flowing an electrolyte through said working gap.

4. Apparatus for accurately producing a desired relieved shape from an electrically conductive workpiece, said apparatus comprising means for mounting said workpiece with an upper surface thereof in a substantially horizontal plane, a wire electrode tilted at a desired relief angle from vertical, means for passing an electric current between the workpiece and said electrode to erode material from the workpiece throughout a predetermined fixed working gap, means for producing relative movement in said horizontal plane between said electrode and the workpiece, and means for controlling said relative movement to produce the desired relieved shape in such a manner as to maintain constant the perpendicular distance between said electrode and the outline of said desired shape in the horizontal plane, said perpendicular distance being equal to said working gap.

5. Apparatus according to claim 4 wherein said controlling means comprises at least one actuator for producing said relative movement between said electrode and the workpiece.

6. Apparatus according to claim 5 wherein said controlling means additionally comprises a programmable controller programmed to control operation of said at least one actuator such as to maintain a common tangent in said horizontal plane to the periphery of said working gap and to the desired shape.

7. Apparatus according to claim 6 wherein said programmable controller is a numerical controller.

8. Apparatus according to claim 6 wherein the periphery of said working gap in a horizontal plane has the form of an ellipse.

9. Apparatus according to claim 4 further comprising means for flowing a dielectric fluid between said electrode and the workpiece.

10. Apparatus according to claim 4 further comprising means for flowing an electrolyte between said electrode and the workpiece.

11. Apparatus according to claim 4 wherein said controlling means comprises a programmable controller.

* * * * *